United States Patent
Castlebury

[19]

[11] Patent Number: 5,901,640
[45] Date of Patent: May 11, 1999

[54] AUTOMATED FRYING MACHINE

[75] Inventor: Michael J. Castlebury, Lakewood, Colo.

[73] Assignee: Mirco Technology, Inc., Denver, Colo.

[21] Appl. No.: 09/105,983

[22] Filed: Jun. 26, 1998

Related U.S. Application Data

[60] Provisional application No. 60/050,802, Jun. 26, 1997.

[51] Int. Cl.[6] .............................. A47J 31/00; A47J 37/12
[52] U.S. Cl. .................................. 99/330; 99/357; 99/407
[58] Field of Search .............................. 99/330–334, 336, 99/335, 357, 352–355, 516, 536, 403–410, 443 R, 443 C; 221/150 R, 150 A, 150 HC; 222/372; 425/131.1, 132, 376.1, 382 R; 426/231, 509, 523, 438

[56] References Cited

U.S. PATENT DOCUMENTS

| | | | |
|---|---|---|---|
| 4,325,295 | 4/1982 | Caridis et al. | 99/404 X |
| 4,438,683 | 3/1984 | Bartfield | 99/330 |
| 4,540,588 | 9/1985 | Bartfield | 426/231 |
| 4,646,627 | 3/1987 | Bartfield et al. | 99/330 |
| 4,694,742 | 9/1987 | Dover | 99/404 |
| 5,052,288 | 10/1991 | Marquez et al. | 99/407 |
| 5,193,440 | 3/1993 | Frank | 99/353 X |
| 5,197,376 | 3/1993 | Bird et al. | 99/357 X |
| 5,272,961 | 12/1993 | Campbell et al. | 99/353 |
| 5,307,736 | 5/1994 | Sorensen | 99/330 |
| 5,315,921 | 5/1994 | Davis | 99/407 |
| 5,404,796 | 4/1995 | Campbell et al. | 99/357 |
| 5,605,091 | 2/1997 | Garber | 99/330 |

*Primary Examiner*—Timothy F. Simone
*Attorney, Agent, or Firm*—Dorsey & Whitney LLP

[57] ABSTRACT

An improved self-contained frying machine is disclosed and claimed with significantly enhanced reliability, repeatability and maintenance. The extruder and dibber assemblies are not attached to any surface plates, thus permitting easy removal for cleaning. More significantly, the extruder assemblies are not connected to an upper shelf, thereby alleviating misalignment concerns. Efficient motor-driven rack and gear components are disclosed for the extruder assembly, dibber assembly, slide assembly and the carousel assembly. The electrical system comprises a programmable logic controller (PLC) that is preferably mounted in a housing that is external to the machine, preferably resting on the top of the frying machine. The mounting of the PLC and other electrical components in an external box diminishes the interference from background noise introduced by the various motors. Various sensors positioned on the different assemblies provide real-time information to the PLC. Based upon the information from the sensors, the PLC commands the various devices to perform their predetermined functions.

20 Claims, 9 Drawing Sheets

AUTOMATED FRYING MACHINE

CROSS-REFERENCE TO RELATED APPLICATION

This application is a non-provisional application relating to provisional application U.S. Ser. No. 60/050,802 filed Jun. 26, 1997.

BACKGROUND

There are many types of machines in the prior art that fry food products. These machines typically have a mixing chamber for receiving dehydrated food product which is mixed with water to form a dough mixture, then shaped into pieces of predetermined size and fried in oil.

A known frying machine is that described in U.S. Pat. No. 5,605,091. This system has a mixing chamber for receiving a pre-measured amount of dehydrated food product from a storage area, and rehydrating and solidifying the same, and a piston for compressing the rehydrated food product and forcing it through an orifaced die plate to form individual pieces. The pieces are then dropped into a hot oil chamber and fried. A dibber system is provided for separating the fries during the frying process. The fries are then drained and served in a container for the customer.

This prior art system, however, has some shortcomings. For example, the extruder assembly is a lead screw design that is mounted in a piston chamber. The piston chamber is mounted to an upper plate attached to the machine housing. After repeated use of the frying machine, the extrusion assembly becomes disaligned due to expansion and contraction of the connected extruder assembly components, as a result of the extreme heat in the machine. Because the piston assembly is firmly attached to an upper shelf, there is no room for such expansion and contraction of the components. Once misaligned, the unit typically malfunctions because the sensors do not line up properly, thus causing misreadings. Under such conditions, the mechanical lead screws cramp down and lose power. For example, the extruder assembly would start to jam during the compression and extrusion processes. Further, the mounting of the extruder and dibber assemblies to the upper plate of the machine makes cleaning very difficult and burdensome, since these assemblies can not easily be removed from the machine. The machine of U.S. Pat. No. 5,605,091 also discloses belts and pulleys to drive the extruder, carousel and dibber assemblies. Therefore, such belts and pulleys must be removed during cleaning. In addition, the belts and pulleys do not reliably produce consistent movement in the components due to general wear and tear resulting from excessive heat, such wear also causing slippage of such belts and pulleys offtrack. Such belts have to be replaced often to approach consistent and reliable operation.

The control and electrical system of the machine described in U.S. Pat. No. 5,605,091, i.e. the CT-100, also has disadvantages. This machine has several sensors which have shown susceptible to failure. Further, the close proximity of the electronics to the motor introduces substantial background "noise" which may cause inaccurate sensor readings, etc.. The machine also has a lot of exposed wiring, potentially creating a safety concern to machine operators.

What is needed is a more user-friendly frying machine that has enhanced reliability and repeatability. Further, a machine is needed that allows a layperson to conveniently clean the same.

SUMMARY OF THE INVENTION

The present invention is an improved self-contained frying machine with significantly enhanced reliability, repeatability and maintenance. The extruder and dibber assemblies are not attached to any surface plates, thus permitting easy removal for cleaning. More significantly, the problem in prior art devices with respect to heat impairment and the subsequent malfunction of the extruder assemblies is no longer a concern with the current invention, since the absence of a connection to an upper shelf alleviates misalignment concerns.

The present invention comprises efficient motor-driven rack and gear components for the extruder assembly, dibber assembly, slide assembly and the carousel assembly. Such components significantly improve the consistency, reliability and repeatability of operation of the fry machine components. No longer is malfunction due to the slippage of belts and pulleys a concern. Further, maintenance convenience is dramatically enhanced since service no longer requires the time consuming removal and replacements of such belts and pulleys.

The movement of the dehydrated product from the storage area into the extrusion chamber is made more reliable and efficient. The present invention discloses using a vibrator in the chute from the storage area to the extrusion chamber to ensure that food product consistently flows along so that the product does not become stuck or lodged along the chute. Further, the bevel along the extrusion chamber has been made at an appropriate slope, thus decreasing product buildup in the door of the chamber.

The electrical system of the present invention has been improved to decrease safety concerns, increase reliability and availability, and provide more consistent operation. The electrical system comprises a programmable logic controller (PLC) that is preferably mounted in a housing that is external to the machine, preferably resting on the top of the frying machine. The mounting of the PLC and other electrical components in an external box diminishes the interference from background noise introduced by the various motors. The PLC directs and controls the operation of all of the machine components. The PLC executes the ladder logic programming instructions stored in memory.

Various sensors positioned on the different assemblies provide real-time information to the PLC. In comparison to the sensor systems of prior art machines, the present invention discloses the mere use of the home sensors, to ensure proper alignment of the machine when it has been reset or turned on for the day. Based upon the information from the sensors, the PLC commands the various devices to perform their predetermined functions.

Due to changes in the electrical and control system, the moving components of the machine have been transformed from a time/distance relationship to a distance/function relationship which allows several attempts or repetitions at completing a process, thus drastically reducing machine failure and malfunction.

It is an object of the present invention to provide an improved automated frying machine.

It is a further object of this invention to provide a fry machine that provides significantly enhanced reliability and repeatability.

It is a further object of the present invention to provide a frying machine that dramatically improves the ease of maintenance, knowledge to operate, as well as reduce the necessity of maintenance.

It is another object of the present invention to provide improved extruder, carousel, heating and dibber assemblies that will provide consistent and uniform performance while minimizing the potential for system malfunction.

BRIEF DESCRIPTION OF THE DRAWINGS

FIGS. 2a, b and c show the side cross section, and the back cross section and the top of the extruder assembly, respectively.

DESCRIPTION OF THE PREFERRED EMBODIMENT

Figure 1:
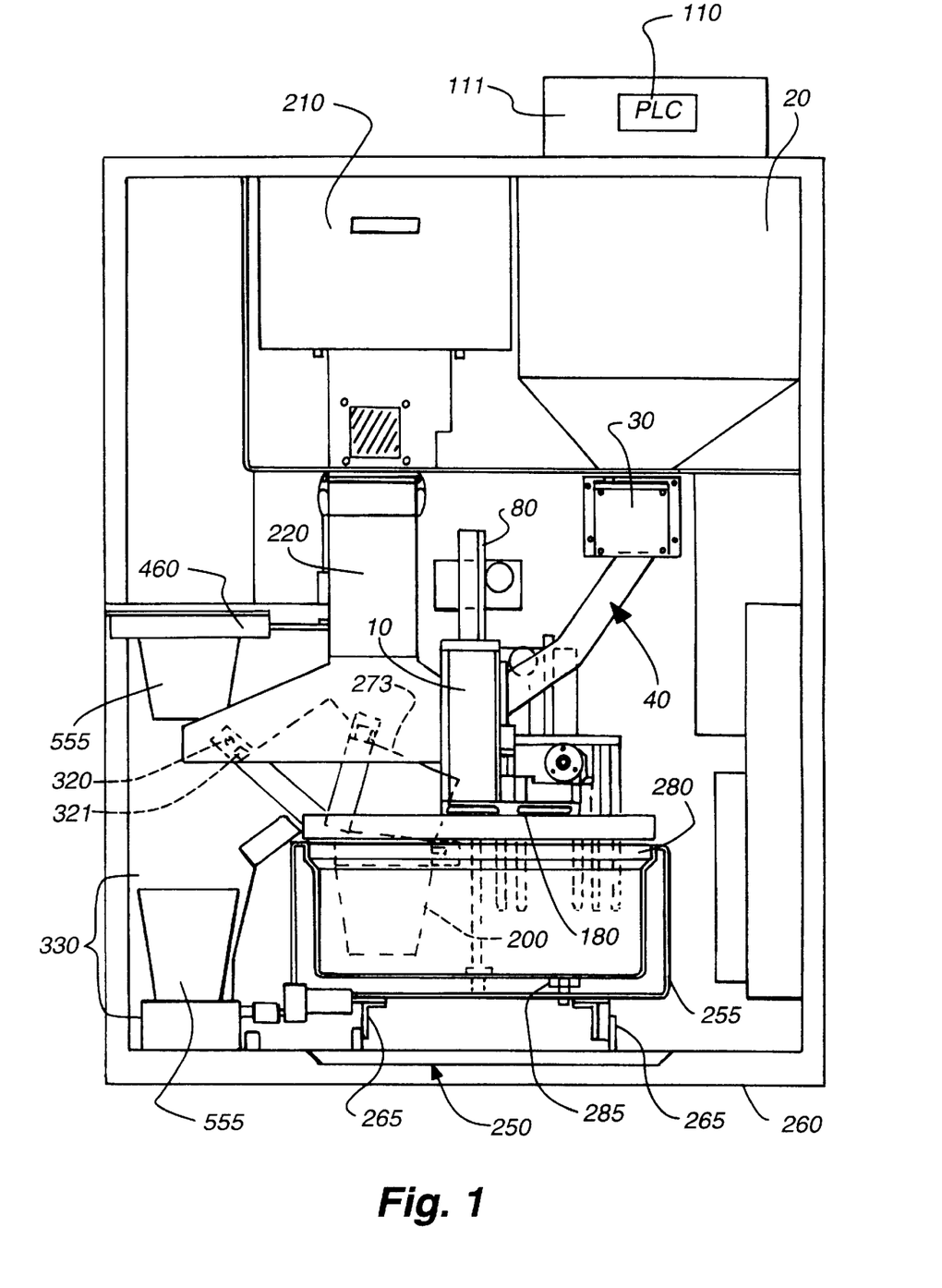
FIG. 1 is a diagram of the components of the frying machine.

An improved frying machine is shown in FIG. 1. FIG. 1 shows the extruder chamber 10 for receiving dried vegetable food product from a hopper 20. Preferably, a predetermined amount of food product is forwarded to the extrusion chamber 10 from a product measure regulator 30 consisting of four baffles, as disclosed in U.S. Pat. No. 5,605,091, herein incorporated by reference. The rotation of the product measure regulator 30 allows for a predetermined amount of food product to be delivered down the supply chute. Preferably, a vibrator is attached to the supply chute 40. The action of the vibrator shakes the chute 40, helping to propel the food product down the chute 40 to the extrusion chamber 10.

Figures 2A, 2C:
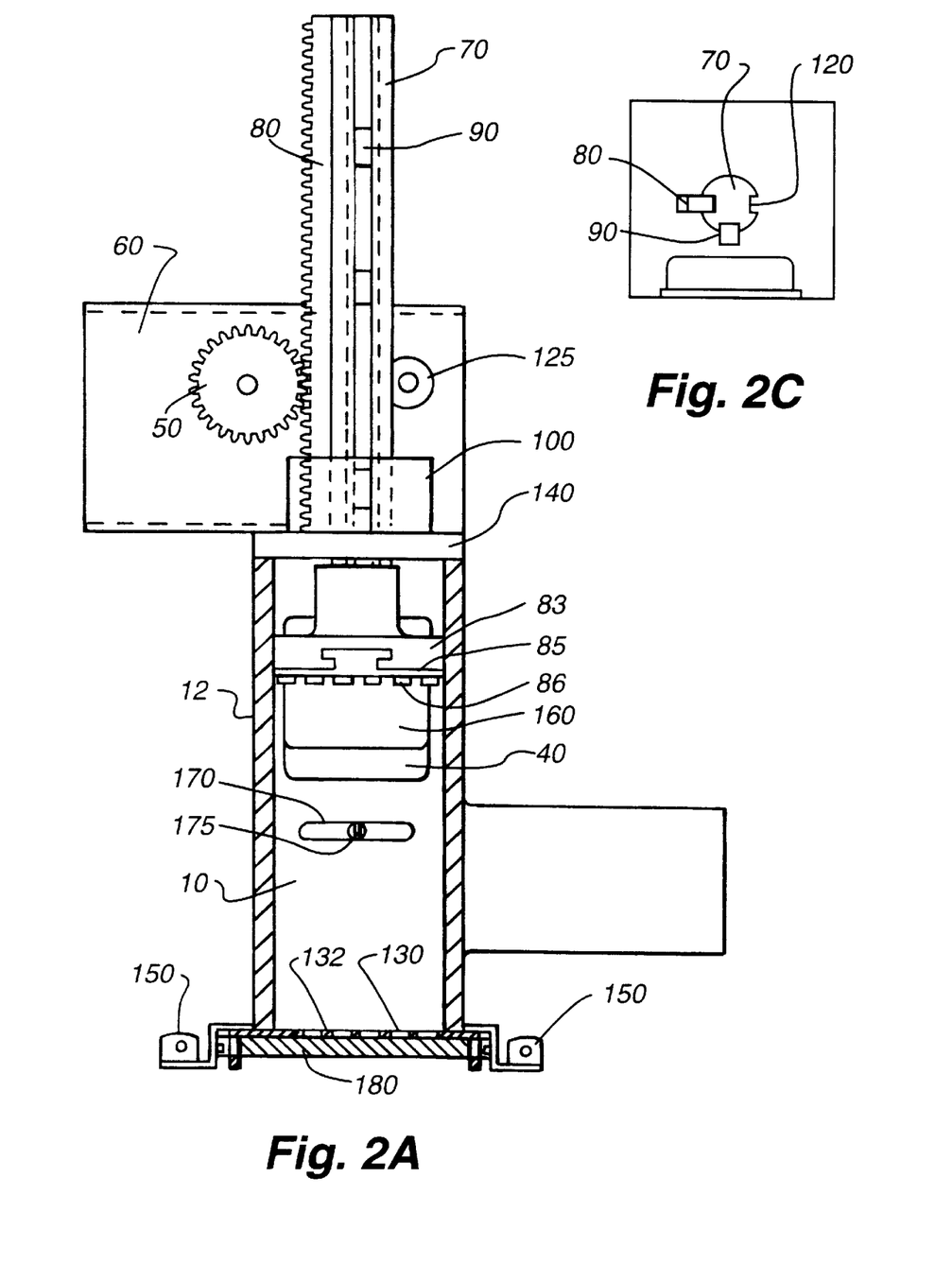
Figure 2B:
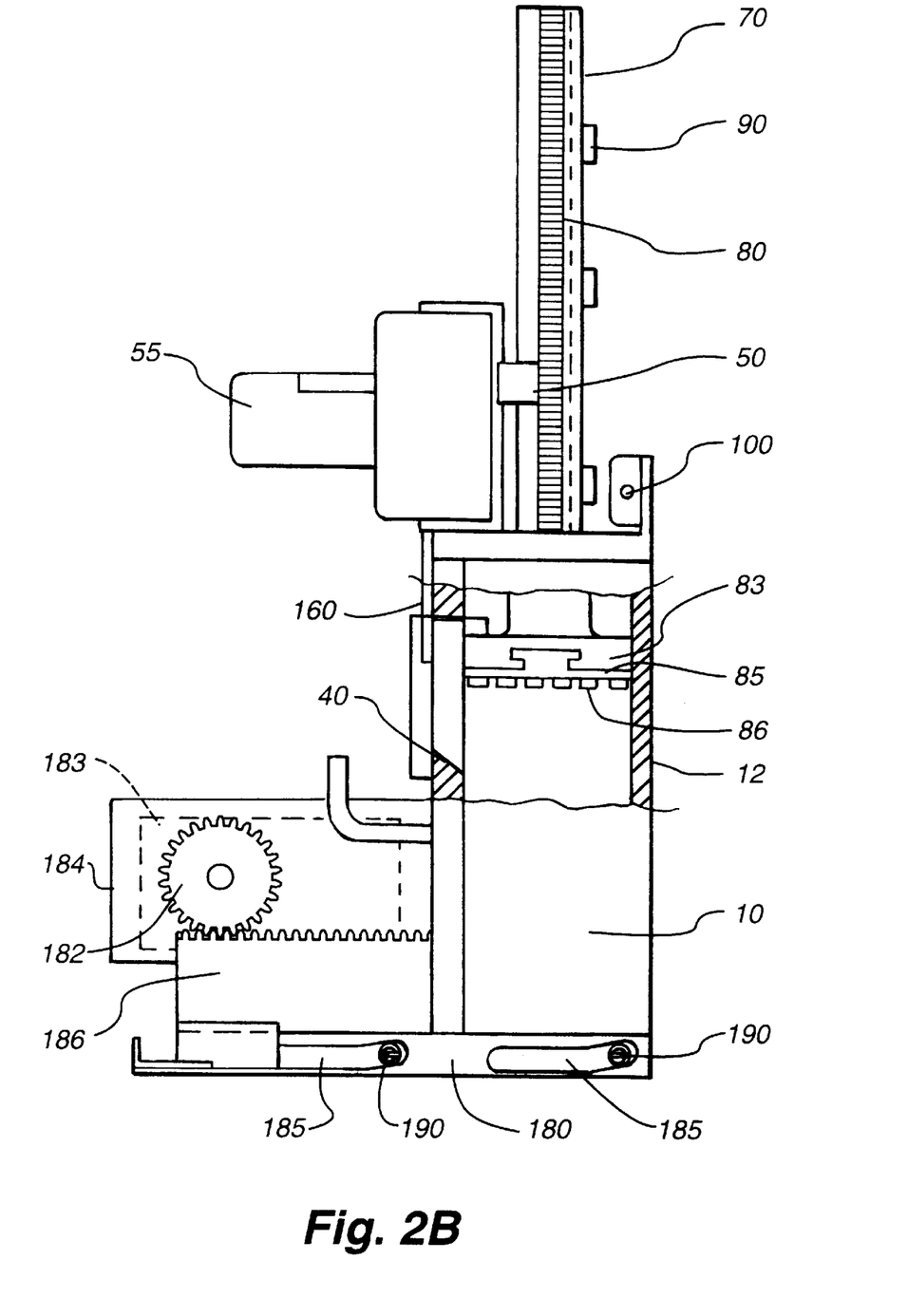

Referring now to FIGS. 2a and 2b of the invention, side and back cross sections of the frying machine extruder assembly are shown. A gear motor 55 is mounted in a motor bracket 60 positioned on top of the extrusion chamber 10. The extruder shaft 70 is preferably comprised of solid metal and cylindrical in cross section. One side of the shaft 70 has been cut to form a channel to receive a rack 80 comprising a number of teeth, as shown in FIGS. 2a, 2b and 2c. These teeth have such dimensions so as to allow a firm fit with the set of teeth formed on the gear 50, as shown in FIG. 2a. The extruder shaft 70 has a ferrous metal sensor flag 90 attached to the side of the shaft. This sensor flag is used to indicate to the proximity switch sensor 100, attached to the top surface of the extrusion chamber 10, and subsequently to the programmable logic controller (PLC) 110 the relative position of the shaft 70, as discussed below. Further, the extruder shaft 70 also has a guide channel 120 formed into its side to receive therein a wheel-like roller guide 125. The roller guide 125 assists in ensuring that the shaft 70 remains in proper position during movement.

The lower portion of the shaft 70 is connected to a compression portion 83. Preferably, the compression portion 83 has a hole with a larger diameter than the shaft 70. The shaft 70 fits within the hole and is preferably connected to the compression portion 83 by one or more screws. Alternatively, the shaft 70 could be connected to the compression portion by any other means known in the art. During the extrusion process, a motor 55 turns the gear in a clockwise direction, resulting in downward movement of the extruder shaft 70. The shaft 70 moves in an upwards direction when the motor reverses the gear 50 direction, thereby rotating the gear in a counterclockwise direction.

The bottom of the compression portion 83 has a T-shaped cut-out opening receiving therein a like T-shaped section of a face plate 85. The face plate 85 has a plurality of spaced protrusions 86 adapted to fit into holes of a die plate 130, as shown in FIG. 2a.

The extrusion chamber 10 preferably comprises a wall 12 surrounding a channel closed at the lower end by the extrusion die plate 130, and enclosed at the top by the extrusion chamber surface plate 140. The extrusion chamber 10 is preferably rectangular in configuration and vertically mounted and coaxially aligned with the extruder shaft 70, as shown in FIG. 2a. The top plate of the extrusion chamber 10 comprises a channel allowing the solid extrusion shaft 70 to be vertically movably mounted therein.

The top portion of the extruder shaft 70 is not attached to a top surface plate. Thus, misalignment of the shaft 70 due to expansion/contraction of the metal due to excessive temperature swings is alleviated with the present invention. Further, the entire extruder assembly can be easily removed from the fry machine for cleaning and/or maintenance by simply unlatching one or more mounting clips 150. The provision of a motor-driven rack and gear system offers significant advantages over belt and pulley systems common in the prior art. For example, movement of the shaft is much more consistent after repeated operation with a gear and rack system.

The potato product is delivered into the extrusion chamber 10 via a spring product door 100, as shown in FIGS. 2a and 2b. The chute 40 from the hopper to the extrusion chamber is preferably at an angle greater than approximately 45° so as to facilitate the complete delivery of the potato product into the extrusion chamber 10. The springed product door 160 slides up and down on the outside of the extrusion chamber 10, thereby opening and closing entry into the extrusion chamber 10. Once food product has been delivered into the extrusion chamber 10, the springed product door 160 is closed. This disallows any moisture to go back up into the product chute 40. With past devices, the moisture would build up and plug up the potato product in the product chute, and thus, not allow a free flow into the extrusion chamber. Another advantage of the spring mounted door 160 is that it ensures cleaning of the potato product when the door is down.

As shown in FIG. 2a, a circular portion is shown in the middle of the water inlet 170. This is called the water inlet diffuser 175. The diffuser 175 is used to diffuse water over the product in order to completely cover the product evenly, instead of soaking one side with dry product on the other side. Therefore, as water is being forced into the chamber 10, the water is diffused to the far side of the chamber 10, allowing the water to both spray to the far side as well as the bottom of the chamber 10.

As shown in FIGS. 2a and 2b, a slide mechanism is shown attached to the lower portion of the extruder chamber 10. The flat slide 180 is mounted to a panel. The slide 180 is activated through a rack and pinion gear assembly. A die plate 130 is provided at the forward end of the panel. The slide assembly includes a motor 183 driving a gear 182 mounted to a housing 184. An elongated gear rack 186 is mounted to the slide. A pair of elongated slots 185 are provided on both side walls of the panel. Each slot 185 turns up slightly at the ends. As shown in FIG. 2a, a pair of wide shoulder stainless steel screws 190 extend through cam followers and ride within the slots 185.

As seen in FIGS. 2a and 2b, the extruder slide 180 is disposed below the die plate 130. The slide 180 moves in the direction of the arrow when the motor 183 turns the gear 184 counter-clockwise, thereby moving the entire rack assembly 186 to the right, or in the direction of the arrow. The slide 180 closes off the extrusion chamber 10 completely when the potato product and water mix are deposited into the extrusion chamber 10. The downward motion of the rack 80 then forces the mixed product through the slots 132 of the dye 130 when the slide 180 has been moved all the way back to the lefthand position. The slide 180 is then moved back towards the right, thereby slicing the fries off and making a complete cut. Thus, the slide 180 performs the following two functions: 1) it closes the chamber 10 off to insure a water tight rehydration chamber; 2) it functions to sever the fries after they have been extruded through the slots 132 of die 130, thus releasing the fries into the carousel cooking basket 200 as discussed below.

Figure 3:
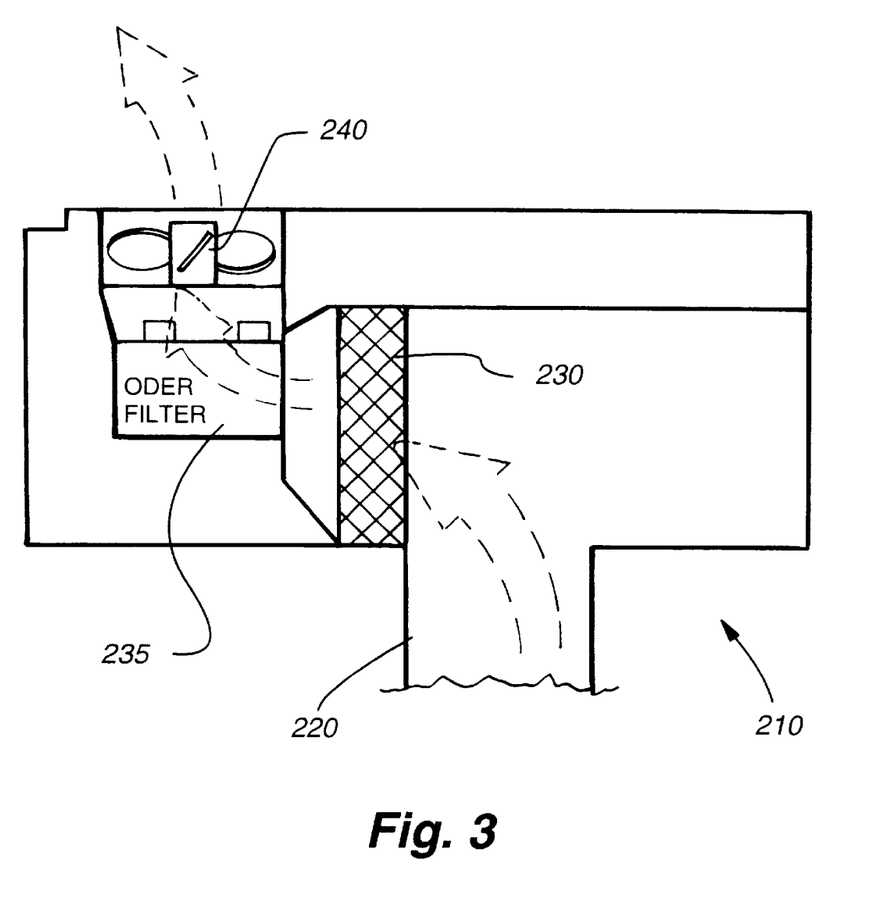
FIG. 3 shows a diagram of the air ventilation system.

Referring to FIGS. 1 and 3, an air management system 210 is depicted for exhausting the vapors from the heated cooking oil used in the machine. As seen in FIG. 1, the vapors from the cooking compartment 250 are removed to the exhaust inlet of the air management system 210 housing via air ducts. The exhausted vapors, as indicated by the arrows in FIG. 3, pass through the filter 230 and as indicated by another arrow, pass through an ODER filter 235, preferably made of non-charcoal material. The filter 235 is positioned in a vertical position. Finally, the vapors are passed through one or more fans 240, and then exhausted to the atmosphere as indicated by arrows. Preferably, the ODER filter 235 comprises a mineral, allowing both odor as well as moisture to be eliminated.

Figure 4:
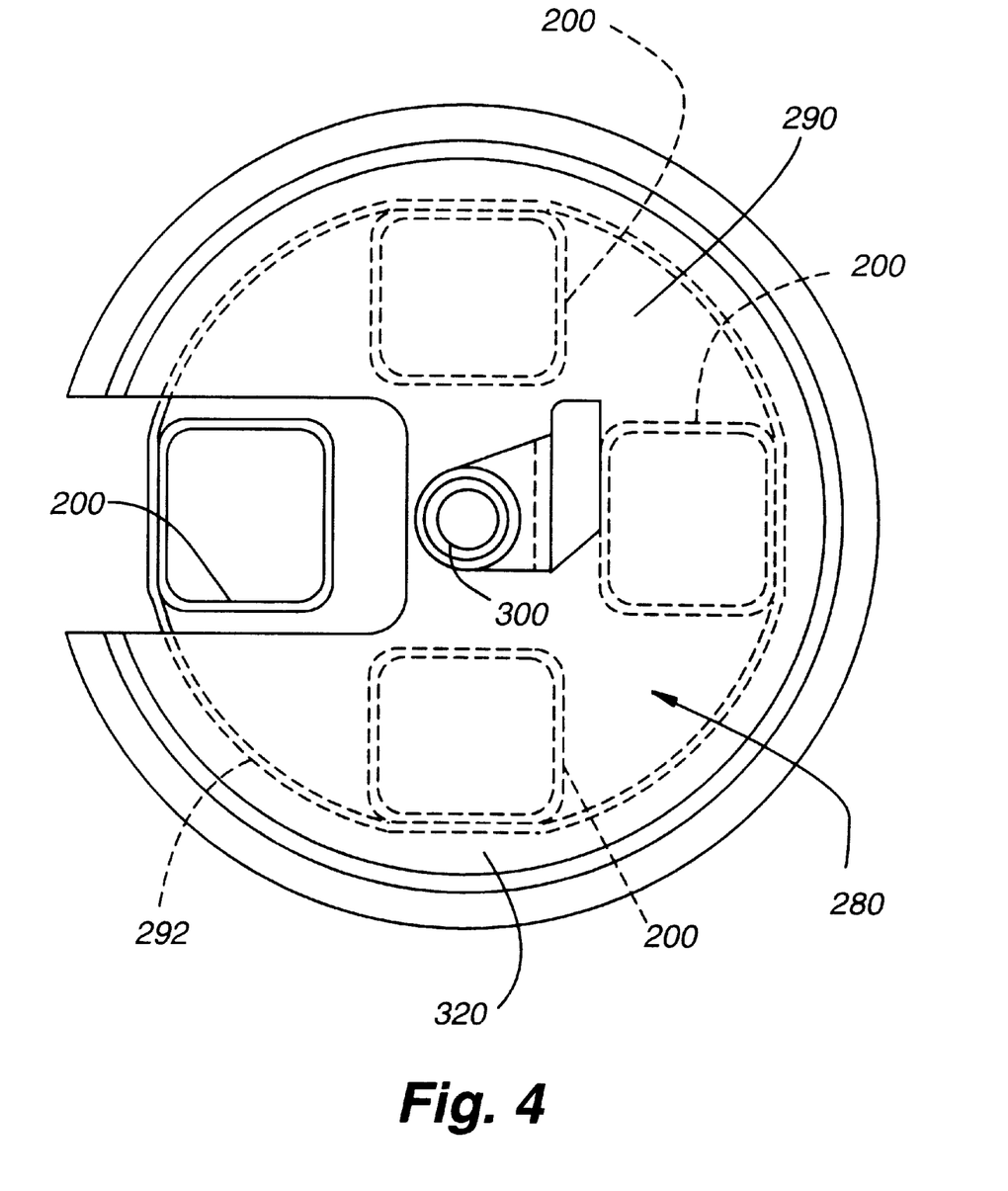
FIG. 4 shows a top view diagram of the carousel assembly.

The cooking compartment 250 includes a main assembly which is mounted to the frame 255 supported to the bottom wall of the housing 260 by a plurality of space support legs 265, as shown in U.S. Pat. No. 5,605,091, herein incorporated by reference. A fry pot 280 is mounted internally in the assembly, as shown in FIG. 1. A plurality, preferably four, of frying baskets 200 are mounted on a carousel 290 rotatably mounted inside of a fry pot 280, as shown in FIG. 4. A hole 285 is provided in the bottom wall of the pot 280, normally closed by a valve, for draining the same.

The carousel 290 mounts on its central axis and provides support in mounting for the baskets 200. A vertical shaft 300 extends from bushing through cover. A cylindrical band 292 extends around the carousel 290 for stiffening the same.

A direct drive motor 310 is preferably attached at the top of the shaft 300, as shown in FIG. 4. The direct drive motor 310 is mounted to the pot lid 320 and to the carousel 290. The direct drive motor 310 rotates the shaft 300, and thus, the baskets 200 around the carousel 290. There are several advantages to using a direct drive motor 310 as opposed to a belt pulley system, shown in the prior art. The maintenance and cleaning of the machine is much simpler since the pulleys and the belts do not have to be undone every time cleaning is commenced. Further, the movement of the carousel 290 is more even with a direct drive motor. Finally, there is no necessity to replace the belts during operation, a cumbersome process.

Preferably, a conventional unitary heat band is fastened to the outside of the fry pot 280 in order to bring the oil up to the proper temperature for cooking. Preferably, the power for the heat band is 2500 watts with amperage down to around 12 amps, thereby allowing a very energy efficient heating system. Preferably, the heating band is a silicone based band. Temperature control is controlled by an off the shelf, microprocessor based controller. In this manner, a consistent non-fluctuating cooking temperature is maintained resulting in near-uniform frying.

The baskets 200 are the vehicles by which the potato products are transported to different locations around the carousel 290. At the different stations, dibbing, separating and draining operations are performed. The dibbing position is preferably in the box on the right hand side of FIG. 4. The draining operation preferably occurs in the basket position shown in the left hand side of FIG. 4.

The lifting mechanism for the carousel is shown in FIG. 1. A lifting plate 320 is shown attached to a basket handle 321. After the food products in the basket 200 are finished cooking, a motor is activated to lift and rotate the shaft in the direction of the arrow in FIG. 1. When in the upper position, the bracket is shaken and the fries are dumped from the basket into a cup 330.

Figure 5A:
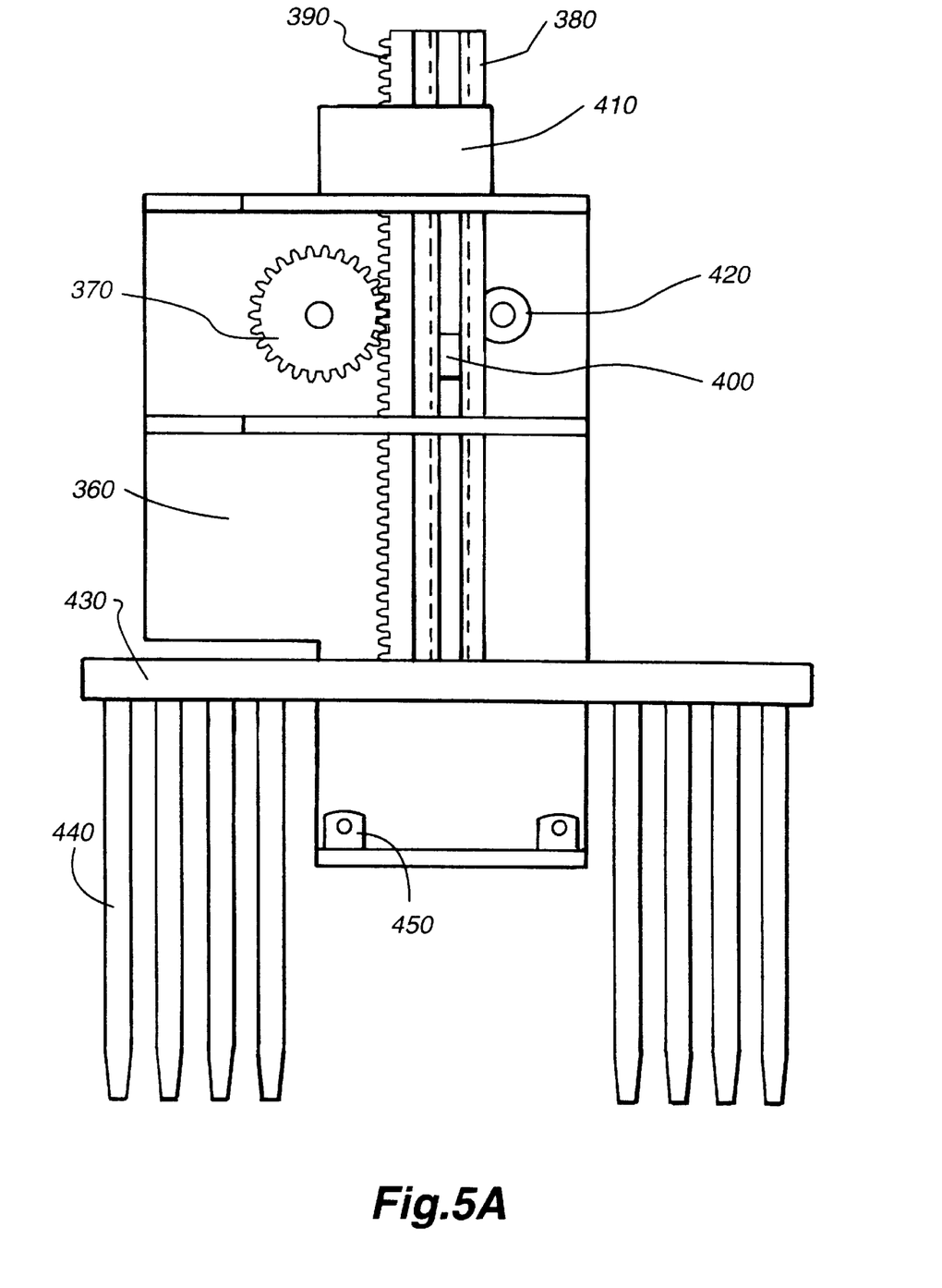
FIGS. 5a and 5b show the front and side views of the dibber assembly, respectively.
Figure 5B:
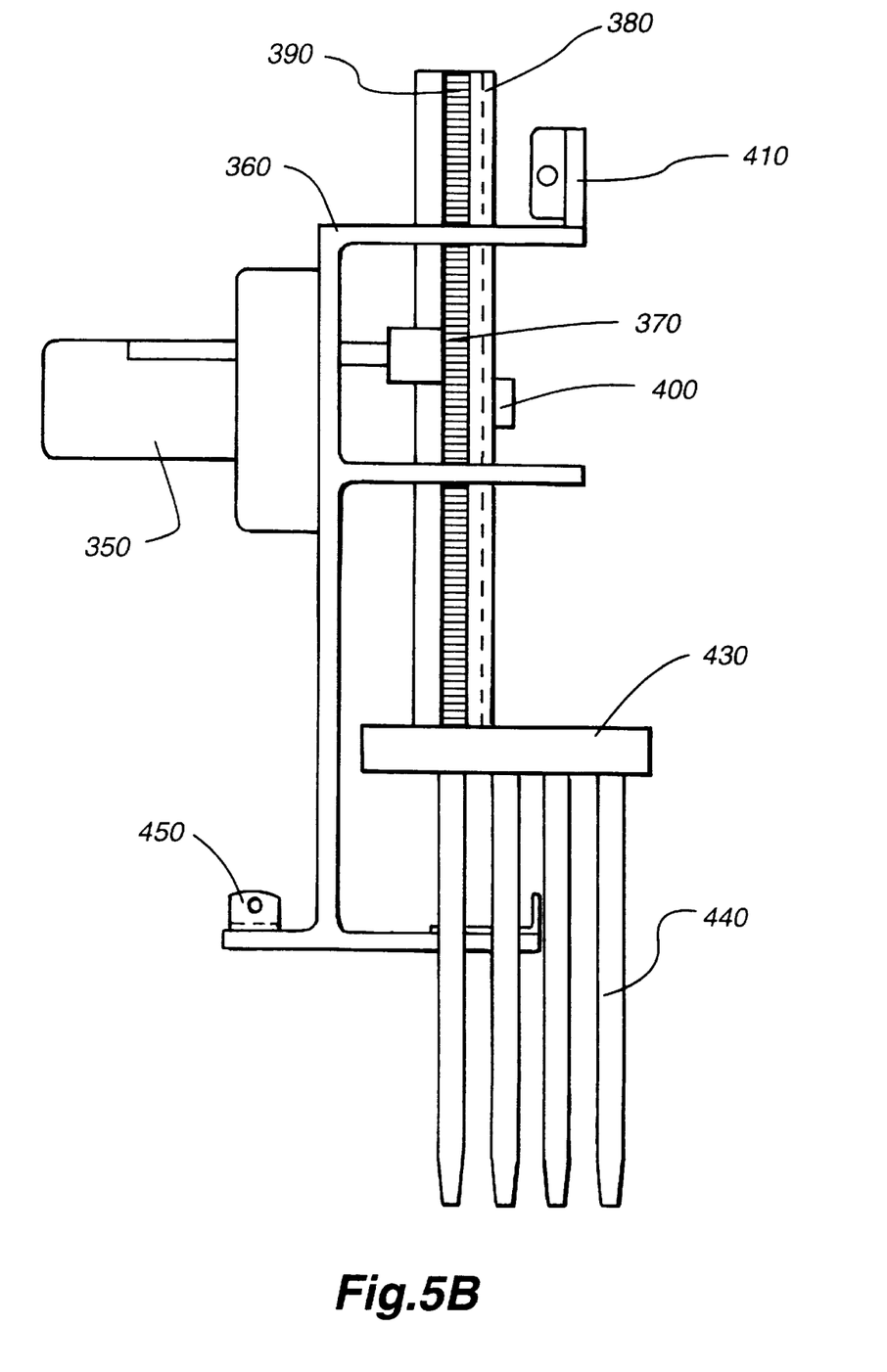

The front and side views of the dibber system of the present invention are shown in FIGS. 5a and 5b, respectively. A gear motor 350 is mounted on a dibber mounting bracket 360 and operably connected to the dibber gears 370. The dibber shaft 380 is preferably comprised of solid metal and primarily cylindrical in cross section. One side of the shaft 380 has been cut to form a channel to receive a rack 390 comprising a number of teeth, as shown in FIGS. 5a and 5b. These teeth have such dimensions so as to allow a firm fit with the set of teeth formed on the dibber gear 370. The dibber shaft 380 has a ferrous metal sensor flag 400 attached to the side of the shaft 380. This sensor flag 400 is used to indicate to the proximity switch sensor 410, attached to the top surface of the dibber mounting bracket 360 and subsequently to the programmable logic controller (PLC) 110 the relative position of the shaft 380, as discussed below. Further, the dibber shaft 380 also has a guide channel formed into its side to receive therein a wheel-like roller guide 420. The roller guide 420 assists in ensuring that the shaft 380 remains in proper position during movement. As with the extrusion assembly, the rack and gear system is advantageous because it is not mounted to an upper shelf, thereby dissipating any sort of heat expansion problems inherent in the prior art.

The lower portion of the shaft 380 is firmly connected to a dibber rod mounting plate 430 by conventional means known in the art, as shown in FIGS. 5a and 5b. The dibber rods 440 are connected to and disposed below the mounting plate 430. The dibber assembly is connected to the pot lid 320 by one or more mounting clips 450. The dibber assembly can very easily be removed from the frying machine by unlatching the clips 450.

The normal position of the dibber rods 440 is above the baskets 200 in the carousel 290 assembly, as shown in FIG. 1. After the strips of fries are deposited into a certain basket 200, the basket 200 is rotated to the dibbing position, shown in the right hand side of FIG. 4. When the basket reaches this position, the dibber motor 350 is activated, thereby turning the gear 370 in a clockwise direction which results in the solid dibber shaft 380 moving in a downward direction, thereby lowering the dibber rods into the basket 200. The program logic control (PLC) system 110 directs and controls the action of the dibber mechanism, as discussed below. Preferably, the proximity sensor 410 is located on top of the dibber housing framework 360. When the proximity sensor 410 notices that the solid dibber shaft 380 has passed below the sensor 410, the sensor is tripped and the motor 350 is then reversed to return the dibber shaft 380 housing back up to the normal position, the upward movement thereof being stopped when the sensor 410 is then tripped by the solid dibber shaft 380. At this point, the motor 350 and rack 390 and gear mechanism 370 is stopped by direction from the program logic control system 110. Alternatively, the sensor in conjunction with the PLC 110 operates by allowing the dibber to move down for so many revolutions of gear 370 or a predetermined number of electrical pulses, and then directs the motor driven shaft 380 to return back to the home position.

When the rods 440 contact the hot oil in the pot 280, the temperature differential created results in excessive bubbling. The agitation and aeration causes any clumping of the uncooked strips of fries to break up. The strips are then cooked for a predetermined amount of time and the cooked french fries are dumped out of the baskets 200 as previously discussed with respect to FIG. 4.

The cup assembly 330 is positioned on the left hand side of the inside of the frying machine as shown in FIG. 1. The cup assembly is preferably connected to the inside walls of the frying machine housing by bolts or screws. This particular cup assembly 460 has the structure and manner of operation as is known in the art, such as that described in U.S. Pat. No. 5,605,091, herein incorporated by reference. The cup drop assembly 460 includes a cup drop housing having a bottom shelf, a movable front wall, a movable vertical rear wall, a vertical side wall and a top wall comprised of a pair of telescoping sections. A difference between the present invention and the prior art device is that a safety retention pin has been added to the top corner of the cup assembly to prevent any injury to machine operators. Further, instead of having the cups fall down the chute by gravity, preferably, they are basically augured down individually. The bottom portion of the assembly takes the lip of the cup and augers the cup down, thereby insuring no jamming of the cup.

Figure 6:
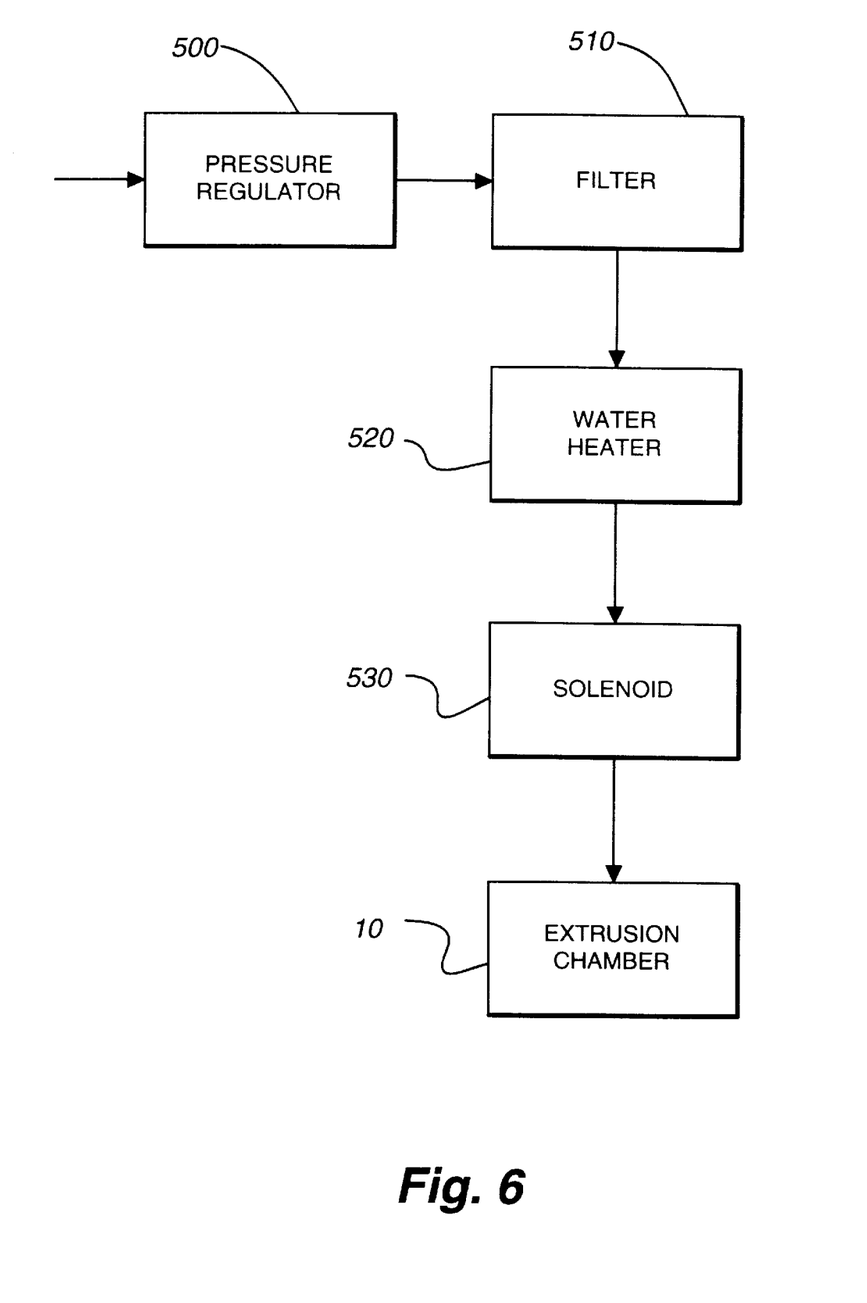
FIG. 6 is a schematic illustration of the water supply for the apparatus of the invention.

The water flow diagram is shown in FIG. 6. Water is introduced into the machine from any suitable source via an inlet leading to a pressure regulator 500. The water passes from the pressure regulator 500 to the filter 510. The filtered water from the filter 510, which ensures that hard water deposits, solid particles or contaminants are removed, is then fed through a water heater 520. The solenoid 530 then assures that the correct predetermined water volume is introduced into the extrusion chamber 10.

The electrical system of the present invention has been improved to decrease safety concerns, increase reliability and availability, and provide more consistent operation. The electrical system comprises a programmable logic controller (PLC) 110 that is preferably mounted in a housing 111 that is external to the machine, preferably resting on the top of the frying machine, as shown in FIG. 1. The mounting of the PLC and other electrical components in an external box diminishes the interference from background noise introduced by the various motors. The PLC 110 directs and controls the operation of all of the machine components. The PLC 110 executes the ladder logic programming instructions stored in memory. The ladder logic is attached in Appendix A.

Various sensors (e.g. sensors 100 and 410) positioned on the different assemblies provide real-time information to the PLC 110. In comparison to the sensor systems of prior art machines, the present invention discloses merely using the home sensors, to ensure proper alignment of the machine when it has been reset or turned on for the day. Based upon the information from the sensors, the PLC 110 commands the various devices to perform their predetermined functions.

Due to changes in the electrical and control system, the moving components of the machine have been transformed from a time/distance relationship to a distance/function relationship which allows several attempts or repetitions at completing a process, thus drastically reducing machine failure and malfunction.

Figure 7:
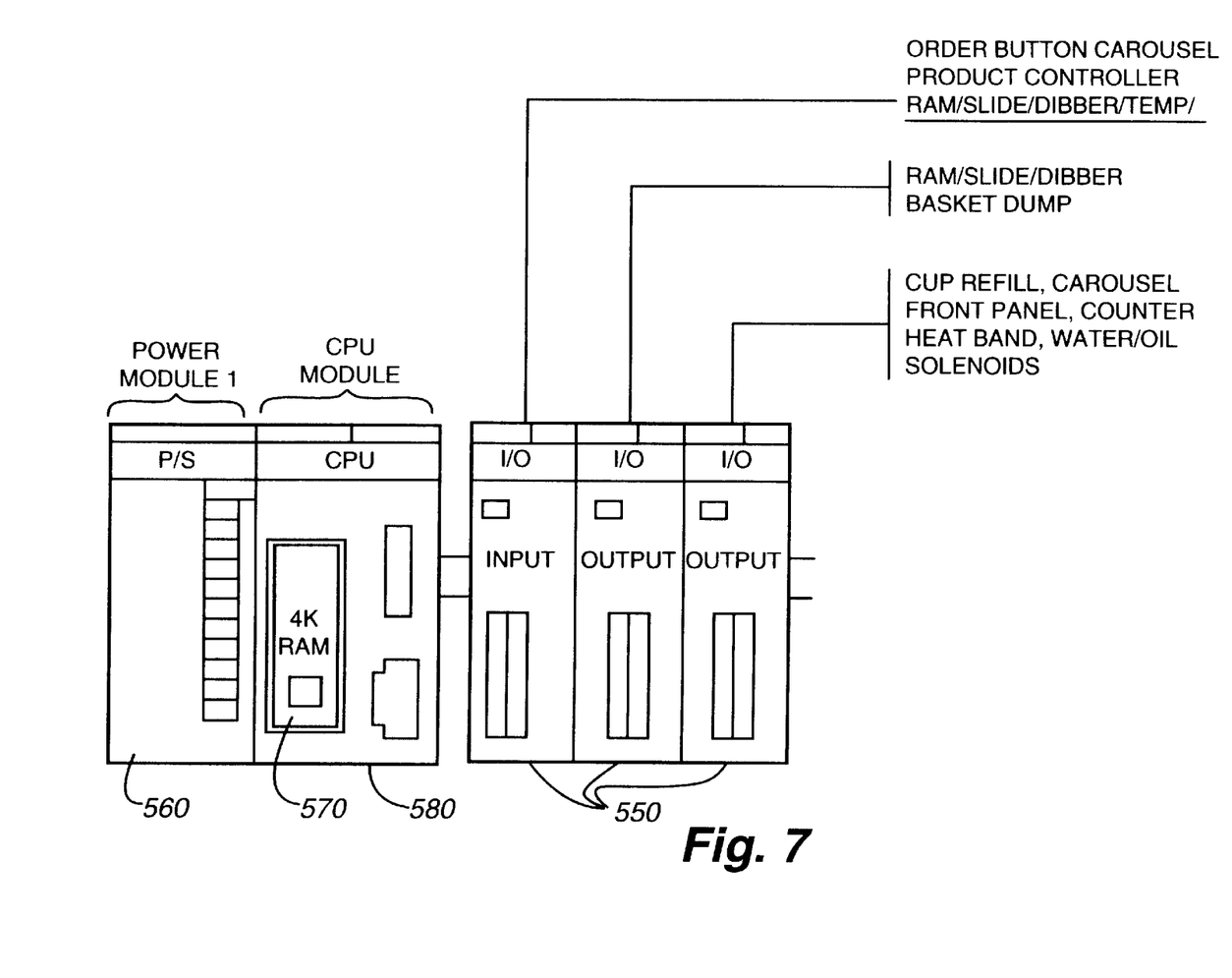
FIG. 7 is a schematic diagram of the layout of the control circuit.

The control assembly comprises a programmable logic controller (PLC) 110, input and output cards 550, power supply 560, memory 570 and back planes for mounting, as shown in FIG. 7. On the front of the machine there is a smoke glass window allowing access to the components inside the housing. Preferably, the processor 580 is an IDEC programmable logic controller, with the input logic either a 0 or 5 volt logic. The outputs are either 5 or 12 volts depending upon the device they are driving. For example, when the PLC 110 is driving motors, the necessary output is 12 volts. Further, the solenoids for the water operate at 12 volts. However, the sensor inputs and the heating band employ 5 volt relays.

The PLC 110 basically consists of a two port backplane or three port backplane. The equipment is mounted to the backplane. The PLC 110 has a power supply that is 220 volts AC to 5 volts DC which fields the bus. The PLC 110 plugs into the back plane. The PLC is connected to a 4K RAM memory block 570. Preferably, the memory is a 4K C-MOS RAM. However, it could also be EPROM, EEPROM or any type of non-volatile memory. The PLC 110 connects to the RAM via a slot in the front of the block. The two back planes are also connected by an interconnecting cable to a power supply. The power supply powers the back plane bus. Another slot is an import card which allows the sensors to be connected to the PLC.

The electrical system operates as follows. With reference to FIGS. 2a and 2b, when the extruder shaft 70 is all the way up, a signal is sent from the PLC 110 to the slide whereupon the slide 180 is shifted to the right to block off the bottom of the extrusion chamber 10. Another sensor spots that the slide 180 is closed and sends a signal to the PLC 110 indicating the same. Once the PLC 110 determines that the slide 180 is closed, a command is issued to shoot a first water shot into the extrusion chamber 10. To do this, the PLC 110 sends a signal to the water solenoid 530 to send the first water shot. The first water shot essentially wets the chamber 10 down. When the shot is activated, a timer is set and at the conclusion of the timer, the water is turned off.

Then, the PLC 110 sends a signal to the product dispenser 30 to dispense product for one revolution. One revolution equates to one and a half ounces of product. Once the revolution is completed, the PLC 110 then sends another signal to the water solenoid to initiate a second water shot which is the balance of the two and half ounces required for product hydration. The PLC 110 then waits for a predetermined period for the hot water and product to mix themselves together.

The PLC 110 follows with a command to the extrusion assembly motor 55. The extrusion assembly motor 55 drives the gear 50 which then directs the rack 80 and the solid extruder shaft 70 to begin moving in a downward direction. The faceplate 85 attached to the shaft 70 moves about halfway down into the extrusion chamber 10 in order to compress the product mixture. Again, a waiting cycle is entered for a period of time. Once the period of time is completed, the PLC 110 sends a command to the slide motor 183 and the motor 183 opens the slide 180 by moving the slide 180 in a leftward direction, as shown in FIG. 2.

When the sensor determines that the slide 180 is open to the full extent, it sends a signal indicating the same to the PLC 110. At this point, the PLC 110 issues a command to the extrusion assembly motor to drive the solid extruder shaft, and consequently the face plate, all the way down to the bottom of the extrusion chamber. Thus, the solid mixture product is being forced through the cut openings in the bottom plate. After a certain period of time, the PLC 110 issues another command to the slide rack motor to direct the slide to close, i.e. move in a rightward direction. At this point, the slide cuts off the pieces of mixture, thereby dropping them into one of the baskets. The PLC 110 then issues a command to the extrusion assembly motor to drive the face plate up towards the halfway portion of the extrusion chamber. Once the face plate is located at this position, the PLC issues another command to reverse the direction of the gear thereby driving the shaft in a downwards direction again to clean out the extrusion chamber completely.

The PLC 110 issues a command to the carousel motor to rotate the carousel assembly 90°. The basket is being moved into the first separator stage. When the basket moves into position, a sensor sends a signal to the PLC 110 indicating it is in the proper position. Preferably, the sensor is attached to the motor 300. The PLC 110 issues a command to the dibber motor 350, as shown in FIGS. 1, 5a and 5b to begin the separation process. Again, the motor 350 directs the gear 370 to move in a clockwise position thereby forcing the dibber shaft 380 in a downward direction and slowly inserting the dibber rods 440 into the baskets. After a certain predetermined time period, the PLC 110 then commands the motor to reverse the gear in a counterclockwise direction thus resulting in the solid dibber shaft to move in an upwards direction. When the sensor picks up that the solid dibber shaft it indicates such to the PLC 110. The PLC 110 then directs the motor to again force the dibbers into the baskets to separate the fries one more time. The PLC 110 then waits a predetermined period of time allowing the fries to cook themselves. Then, the PLC 110 issues another command to the carousel motor to rotate another 90°. At that position, the PLC 110 commands the dibber assembly to repeat the process described above. Once the cooking cycle is completed, the PLC 110 issues a command to the carousel to rotate 90° and stop, thereby positioning the basket at the left hand location in FIG. 4. The basket is now in a position to drain, dump and serve the fries. The PLC 110 waits for a predetermined period of time allowing the basket to drain. At the end of the cooking time, the PLC 110 issues a command to the basket lift motor 350 to rotate the basket up to a certain position as shown in FIG. 1. The fries then drain for a period of time and the PLC 110 is again in a wait mode. When the time period is complete, the PLC 110 issues a command to the lift motor 273 to dump the fries into one of the cups.

Simultaneously with the draining action, the PLC 110 issues a command to the cup drop system 460 to drop a cup 555 which drives a cup down to a belt. When the cup 555 hits the belt, there is a sensor that sees the cup 555 and reports that the cup is in position to the PLC 110. The PLC 110 then issues a command for the belt motor to start and move the cup up so it comes from the rear of the machine. Just before the last cooking cycle is complete, the PLC 110 issues a command to drop a cup 555, moving the cup 555 equal to a position on the left hand side of the pot lid 320 and once a sensor sees that the cup 555 is at the center location, the belt is stopped and the PLC 110 is sent a signal stating the same.

With the cup 555 in the proper position, a signal is sent from the PLC 110 to the lift motor 273 to dump the fries and the basket 200 is moved in a counter clockwise position until all fries are dumped out of the said basket 200. Once the fries have been dumped into the cup 555, the cup 555 is moved to the serve position which is basically all the way to the front of the machine. A front sensor senses that the cup is in place and indicates such to the PLC 110. The PLC 110 commands the motor to shut off and also to set off a beeper telling the client that the service is done.

With respect to all the sensors described above, preferably these sensors are IDEC proximity switches or AMRON holofex sensors. The sensors actually act to sense a mass of metal. The sensors consist of four magnets in a glass encased sealed reedswitch. The four magnets set up a fluxfield around the reedswitch which holds the reedswitch open as long as the fluxfields are not interfered with. However, as a piece of metal passes over the top of the magnets, the fluxfields are disrupted and the switch is closed. Once the mass moves away, the fluxfield returns to normal, thereby opening the switch up.

Obviously, variations and other means and processes for carrying out the teachings of the invention may occur to one of ordinary skill in the art, and this invention is meant to cover all such variations.

I claim:

1. A fry machine comprising:
   a hopper for dispensing a dehydrated food product into a mixing chamber;
   an extrusion chamber having an upper end, lower end, and an opening leading therein communicating with said hopper, the extrusion chamber comprising a wall surrounding a channel;
   an extruder shaft positioned above the extrusion chamber communicating with the upper end thereof and vertically movably mounted in the channel of the extrusion chamber, the shaft having an upper end and a lower end with a compression portion at the lower end thereof, the shaft operably in contact with a gear for moving the rod from a first position wherein the compression portion is disposed away from the lower end of the extrusion chamber to a second position wherein the compression portion is disposed adjacent the lower end of the extrusion chamber; and a die plate closing off the lower end of the extrusion chamber;
   the die plate having a plurality of predetermined spaced openings extending therethrough;
   a reciprocally mounted slide below said die plate and including reciprocating means for reciprocating the slide from a first position normally closing off the spaced openings through the die plate to a second position disposed away from the spaced openings thereby allowing passage of food product therethrough;
   a water inlet for communicating fluid into the interior of the extrusion chamber; and
   a fry pot mounted below the slide having at least one basket mounted therein.

2. The fry machine of claim 1 wherein the extruder shaft has a channel on one side, the channel receiving a rack comprising a first plurality of teeth, and wherein the gear has a second plurality of teeth with such dimensions so as to allow a firm fit with the first plurality of teeth formed on the rack, and a motor for selectively rotating the gear and thereby moving the extruder shaft.

3. The fry machine of claim 1 wherein the extruder shaft has a sensor flag attached to the side of the shaft, the sensor flag used to indicate the relative position of the shaft with respect to the extrusion chamber.

4. The fry machine of claim 1 wherein at least four baskets are disposed in the fry pot spaced about the central axis thereof.

5. The fry machine of claim 1 further comprising basket removal means associated with the basket for lifting the basket out of the fry pot.

6. The fry machine of claim 5 wherein the basket removal means comprises flipping and shaking means for flipping the basket over and shaking the basket so that anything in the basket can fall out of the basket.

7. The fry machine of claim 6 including a cup station mounted in the machine adjacent the fry pot for receiving therein a cooked product from the basket.

8. The fry machine of claim 7 including cup delivery means associated with the cup station for selectively delivering one cup at a time to the station.

9. The fry machine of claim 1 wherein the hopper includes a chute coupled to the opening leading into the extrusion chamber and including valve means associated with the chute for delivering a predetermined amount of dehydrated food product from the hopper through the opening leading into the extrusion chamber.

10. The fry machine of claim 9 wherein a spring product door is movably attached to the outside of the extrusion chamber and positioned between the chute and opening leading into the extrusion chamber, the springed product door oriented so as to slide up and down on the outside of the extrusion chamber, thereby opening and closing entry into the extrusion chamber.

11. The fry machine of claim 1 wherein the water inlet has diffused slots, the diffused slots allow water to be diffused over the product in order to completely cover the product evenly.

12. The fry machine of claim 1 wherein the reciprocating means comprises:

a movable rack, connected to the top surface of the slide, the rack comprising a plurality of teeth;

a gear, positioned on top of the rack, the gear having a plurality of teeth with such dimensions so as to allow a firm fit with the set of teeth formed on the rack; and a motor for selectively rotating the gear and thereby moving the rack shaft.

13. The fry machine of claim 1 further comprising air removal and filtering means associated with the fry pot for removing odors and moisture from the fry pot and filtering the same.

14. The fry machine of claim 4 wherein the fry basket is mounted on a rotatable carousel.

15. The fry machine of claim 14 wherein a plurality of baskets are disposed in the fry pot spaced about the central axis thereof, whereby the carousel can be rotated to selectively move the baskets one at a time below the slide.

16. The fry machine of claim 15 further comprising a shaft coupled to the center of the carousel, and a direct drive motor coupled to the shaft for rotating the same.

17. The fry machine of claim 1 further comprising a controlling means, mounted in a housing external to the machine, for directing and controlling the operation of components of the machine.

18. The fry machine of claim 17 further comprising a plurality of sensors, wherein the sensors provide information on component movements to the controlling means thereby allowing the controlling means to command the components to perform their predetermined functions.

19. The fry machine of claim 17 wherein the controlling means comprises a programmable logic controller.

20. The fry machine of claim 9 further comprising a vibrating means, operably connected to the chute, for vibrating the chute so that the food product flows consistently along the chute.

* * * * *